April 28, 1925.
H. L. BOWDOIN
1,535,897
APPARATUS FOR THE MANUFACTURE OF ICE CREAM CONES
Filed April 17, 1922
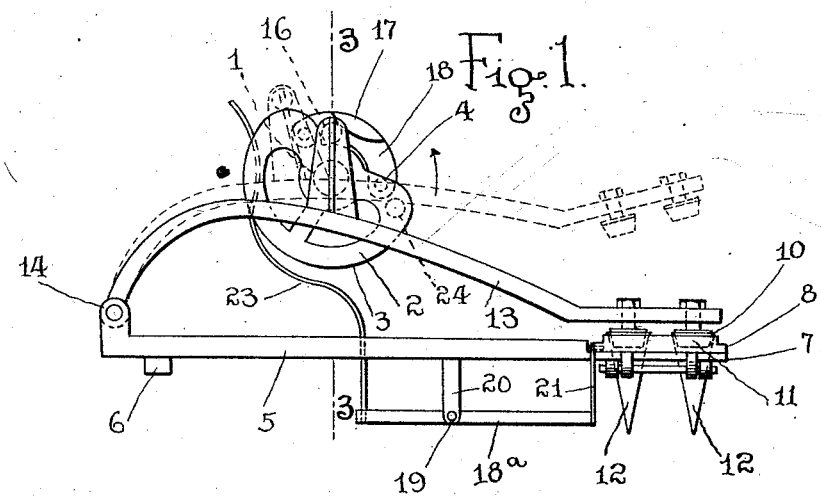
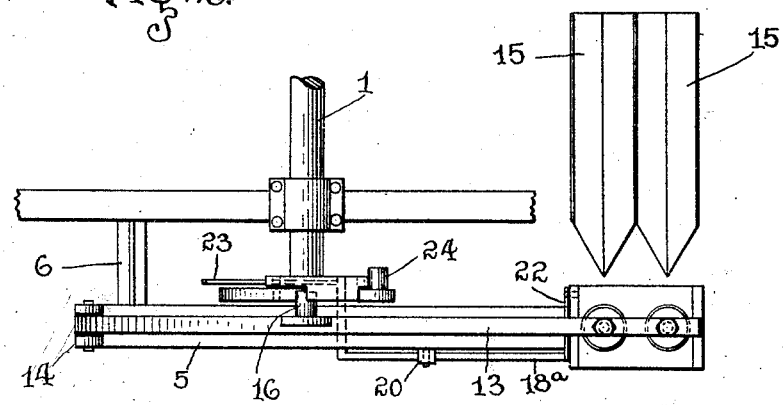
Inventor
Harry L. Bowdoin
By his Attorneys
Featherstonhaugh & Co.

Patented Apr. 28, 1925.

1,535,897

UNITED STATES PATENT OFFICE.

HARRY L. BOWDOIN, OF LONG ISLAND CITY, NEW YORK, ASSIGNOR TO CONE COMPANY OF AMERICA, OF LONG ISLAND CITY, NEW YORK, A CORPORATION OF DELAWARE.

APPARATUS FOR THE MANUFACTURE OF ICE-CREAM CONES.

Application filed April 17, 1922. Serial No. 553,764.

*To all whom it may concern:*

Be it known that I, HARRY L. BOWDOIN, a citizen of the United States, residing at Long Island City, in the county of Queens and State of New York, have invented certain new and useful Improvements in Apparatus for the Manufacture of Ice-Cream Cones, of which the following is an exact and clear specification, reference being had to the accompanying drawing which forms a part of this specification.

This invention relates to apparatus for the manufacture of ice cream cones, and my present improvement is directed particularly to means for trimming the edges of moulded and baked cones, when they have been delivered from the moulds and prior to their ultimate delivery from the machine.

My invention is applicable to the general type of apparatus such as is disclosed in United States Patent No. 1,289,209 of December 31, 1918, with which apparatus it is found in practice that the cones, when delivered from the moulds, have imperfectly stripped edges, there being sometimes a peripheral overhang of cone material which gives a cone an unfinished appearance and which also affords engaging means capable of causing the cone edge to sustain fracture, thereby affecting both its appearance and utility.

It is essential that the cones, as delivered from the machine, should present a smooth and clean cut base edge.

Therefore my invention consists of a support into which the cones are delivered when released from the baking moulds, together with a trimming device which is automatically actuated, in the operation of the machine, to enter into engagement with the support for the purpose of cutting off the rough portions of the cone edge, to leave it with a smooth finish. Means are also provided in the trimming device to positively release the cones therefrom, so that they may fall into a suitable receptacle.

The means for lifting the trimming device out of engagement with the cone support so that the baked cones may pass to the support, involves the employment of certain cam mechanism, and included therewith is a cam portion that positively presses the cutter against the cone edge to efficiently perform the trimming operation.

Other features and advantages of my invention will hereinafter appear.

In the drawing:—

Figure 1 is a side elevation of my improved cone trimming device, with its operating means.

Fig. 2 is a plan view thereof, and

Fig. 3 is a section on the line 3—3 of Fig. 1.

In said figures let 1 indicate a shaft that is driven by a moving part of an apparatus for the manufacture of ice cream cones such as is represented, for example, in Patent No. 1,289,209. Carried by shaft 1 is a cam 2, having the concentric peripheral portion 3 and the reduced portion 4. A horizontal bar 5, mounted on a frame portion 6, has a terminal, enlarged portion 7, which is provided with openings for the reception of baked cones, the upper surface of portion 7 having a top plate 8, hinged thereto at one side by hinges 9, the plate 8 having cone receiving openings 10 aligned with those in the portion 7.

The openings 10, of which two are shown in the drawing, are provided for the reception, respectively, of cutters 11, which are of frusto-conical form, and adapted, on becoming seated in the openings 10, to trim the edges of cones 12 that have become lodged in said openings.

It will be appreciated that the cones 12 are to be delivered to the openings 10 in plate 8 when the cutters 11, which depend from an arm 13, that is hinged at 14 to bar 5, have been raised by said arm to the position shown in dotted lines in Fig. 1; the fixed chutes 15 being positioned to direct the cones to the openings 10 when they are delivered from the moulds (not shown) after the baking operation has been performed.

The arm 13 is provided with a vertical bracket 13ª from which there extends outwardly a stud 16, that engages the periphery of the cam, its function being to raise the arm 13, thereby lifting the cutters, when it is engaged by the concentric peripheral surface of the cam; and to allow the arm 13 to descend and bring the cutters down to openings 10 as the reduced portion 4 of the cam engages the stud.

The cam is provided on one side with a reversely directed, convex projection 17, here represented as extended from an arcuate strip 18, secured, at its opposite ends, to the cam at the reduced portion thereof.

This convex projection 17 therefore is adapted to engage the stud 16, at the upper surface thereof, when, in the operation of the cam the arm 13 has been lowered, and the function of the convex projection 17 is to apply pressure downwardly upon stud 16, for transmission, through arm 13, to the cutters 11, so that the cutters may be forced tightly against their seats in openings 11, and thereby efficiently trim the cone edges.

In Fig. 1, with the cutters in their closed position, it will be seen that the projection 17 has just engaged stud 16, so that continued rotation of the cam will cause the trimming pressure to be applied; and then, the cam will lead the stud to its concentric periphery, whereby the arm 13 and the cutters will be raised. When the cutters have been raised, it is necessary that the trimmed cones shall be freed from the portion 7, so that they may be delivered to a suitable receptacle (not shown). This delivery is assured by lifting the plate 8 from portion 7, whereby removal of the trimmed portions of the cone is performed. To lift plate 8 these instrumentalities are employed:

A lever 18$^a$, pivoted at 19 to a downward projection 20 from bar 5, has a vertical arm 21, with a horizontal extension 22, that engages the plate 8 at its end opposite the hinged end, so that the upward movement of arm 21 will lift the lid. To impart this upward movement to arm 21, the opposite end of lever 18$^a$ carries a curved spring-like member 23, which lies back of the cam, to be in the path of a stud 24, carried by the cam, so that the member 23 is adapted to be yieldingly pressed by stud 24, to rock the lever, and thus cause plate 8 to be lifted. The plate 8 snaps back to its seated position when stud 24 has left member 23. This lifting and snap back action of plate 8 is relied upon to release the cones from portion 7.

Variations within the spirit and scope of my invention are equally comprehended by the foregoing disclosure.

I claim:—

In an apparatus for the manufacture of ice cream cones, in combination, a cone support having an upper, movable portion, a chute to direct a falling cone to the support, a cutter, a cam, means actuated by a moving part of the apparatus to rotate the cam, means upon the cutter co-acting with the cam, for its operation, means for raising and lowering the movable portion of the cone support, to release a cone therefrom, and means upon the cam to operate said raising and lowering means.

Signed at the borough of Manhattan, in the city, county and State of New York, this 28th day of March, 1922.

HARRY L. BOWDOIN.